C. W. METSKER.
STOCK STOP.
APPLICATION FILED JULY 21, 1919.
1,355,992.
Patented Oct. 19, 1920.
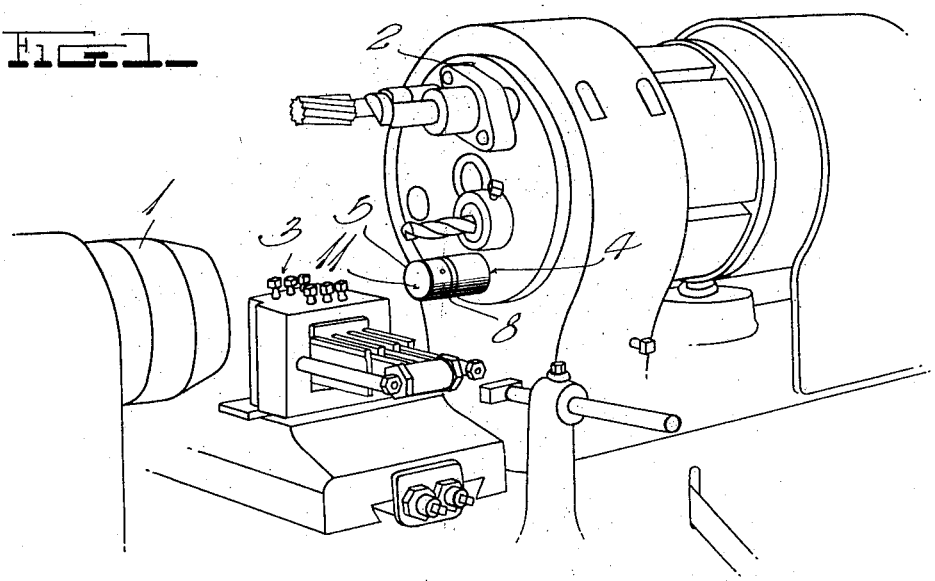
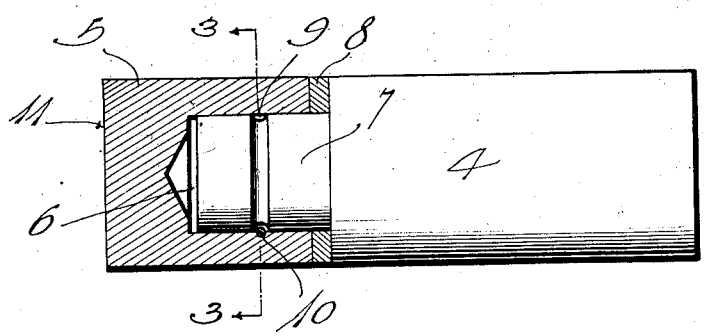
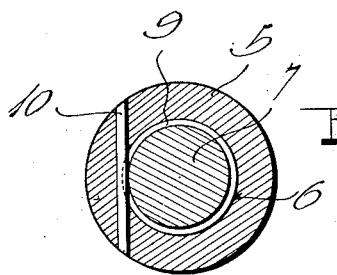
Witness
H. Woodard
Inventor
C. W. Metsker
By H. B. Wilson & Co.
Attorneys

UNITED STATES PATENT OFFICE.

CHARLES W. METSKER, OF CLEVELAND, OHIO.

STOCK-STOP.

1,355,992.  Specification of Letters Patent.  Patented Oct. 19, 1920.

Application filed July 21, 1919. Serial No. 312,116.

*To all whom it may concern:*

Be it known that I, CHARLES W. METSKER, a citizen of the United States, residing at Cleveland, in the county of Cuyahoga and State of Ohio, have invented certain new and useful Improvements in Stock-Stops; and I do declare the following to be a full, clear, and exact description of the invention, such as will enable others skilled in the art to which it appertains to make and use the same.

My invention relates to improvements in stock stops such as those intended principally for use on screw machines where a part is machined from bar stock. The stop is used in the well known manner as a length gage by feeding the bar against it while the chuck of the machine is open and then closing the chuck, the stop serving to hold the bar in proper place until the chuck is closed, after which the stop is swung out of place, and the machining operations follow.

Heretofore, the general practice has been to use a solid piece of bar steel for a stock gage or stop, but where the work spindle or chuck revolves continuously as in the case of automatic screw machines, and in many cases with hand screw machines, the bar of stock revolving against the solid steel stop, immediately after the chuck is closed, causes the stop to become rough and to pick up burs which in turn score the end of the stock and necessitate a facing operation in order to produce a properly finished piece of work.

My invention has for its principal object to overcome the difficulty above pointed out by the provision of a simple and inexpensive, yet an efficient and durable stock stop having a head mounted in such manner as to rotate with the bar of stock when the chuck is closed around said bar. The two parts thus rotating in unison will not cause marring of either one or the other and thus much better results are obtainable.

A further object is to provide a mounting for the rotatable head of the stop which will not necessitate the use of any recesses in the active face of said head, thereby adapting the device for gaging even the smallest stock used. Were a central recess provided in the head and a screw passed through such recess for rotatably mounting said head, the small stock would enter the recess and consequently the gaging operation would not be accurate.

With the foregoing in view, the invention resides in the novel device hereinafter described and claimed, reference being made to the accompanying drawing.

Figure 1 is a perspective view showing the improved stop applied to the well known Cleveland automatic machine.

Fig. 2 is a side elevation of the stop with its rotary head in section.

Fig. 3 is a transverse section on the plane of line 3—3 of Fig. 2.

In the drawing above briefly described, I have illustrated my invention as applied to an automatic turret machine of the well known type manufactured by the Cleveland Automatic Machine Company, but it is to be understood that the invention is not restricted to use upon this particular machine but may be equally well employed on Gridley machines and all others requiring the use of such a stop.

The construction of the machine is well known and need not be specifically set forth, but in brief it may be stated that this machine includes a rotary chuck 1, a rotatable turret 2, and a suitable tool rest 3. The improved stock stop is illustrated as applied to the turret 2 and when so applied it serves as a stop or gage for the usual bar stock before gripping of such stock by the chuck 1. The moment the chuck is closed, the work starts rotating and this rotation injures the stock as well as the stock stop when the latter is of the usual one-piece construction. By providing it with a rotatable head however, this head rotates with the work and no burs or other imperfections are caused. After closing of the chuck, the turret may be turned to shift the stop out of engagement with the work.

The improved stop comprises briefly a body portion or shank 4 and a head 5 mounted on the outer end of said shank and free to rotate thereon, and in the preferred form of my invention, the rotatable connection of the head with the shank consists of a socket 6 in one of these parts and a cylindrical journal 7 on the other, received in the socket. In the present arrangement, the socket 6 is formed in the head 5 and consequently the journal 7 is carried by the shank 4, being by preference an integral part thereof. A wear resisting washer 8 may well be interposed between the inner end of the head 5 and the adjacent end of the shank 4, and I prefer to form this washer of red fiber although any other preferred material could be employed.

I may utilize any preferred means to prevent accidental removal of the head 5, and as typical of one form of such means I have shown the journal 7 provided with a circumferential groove 9 receiving a pin 10 which traverses one side of the socket 6.

By constructing the device in or approximately in the manner disclosed, it may be easily and inexpensively manufactured and marketed, and will be highly efficient and desirable in use, particular attention being directed to the fact that by employing the socket 6 and journal 7, the outer end 11 of the head 5 may be smooth throughout its area and need not be provided with a socket as would be necessary if a screw were passed through said head to attach it to the shank 4. By leaving the face 11 free of indentations, the device will operate to gage even the smallest stock. This however could not be done if a socket were provided in the head, since the small stock would enter such socket and could not therefore be accurately gaged.

The device has been used with great success and since probably the best results may be obtained from the details disclosed, they are preferably followed. I wish it understood however that within the scope of the invention as claimed, the device may be embodied in forms other than that shown.

I claim:

1. A stock stop of the character described having a shank reduced to form a journal stem, and a rotary head having an imperforate flat outer end face and bored from its inner end to provide a socket rotatably receiving the journal stem, and means for rotatably mounting the head upon the stem and holding the head and stem against relative longitudinal movement.

2. A stop comprising a shank member and an imperforate head member in alinement with each other, one of said members being bored longitudinally from its end face to provide a socket and the other having a stem received in the socket to rotatably mount the head.

3. A structure as specified in claim 2, together with a wear resisting thrust collar interposed between the two members, and means engaging the journal to hold the head and shank members against relative longitudinal sliding movement and prevent accidental separation of said members.

In testimony whereof I have hereunto set my hand.

CHARLES W. METSKER.